UNITED STATES PATENT OFFICE.

HEINRICH KRIEGSHEIM, OF NEW YORK, N. Y., ASSIGNOR TO THE PERMUTIT COMPANY, OF NEW YORK, N. Y., A CORPORATION OF DELAWARE.

PURIFICATION OF WATER.

1,192,075.     Specification of Letters Patent.     Patented July 25, 1916.

No Drawing.     Application filed May 16, 1916. Serial No. 97,923.

*To all whom it may concern:*

Be it known that I, HEINRICH KRIEGSHEIM, a citizen of Germany, residing at New York, in the county of New York and State of New York, have invented certain new and useful Improvements in Purification of Water, of which the following is a specification.

This invention relates to the purification of water; and it comprises a method of purifying water by zeolite-like silicates, or the so-called exchange silicates while maintaining a normal composition of such silicates which comprises adding to water to be filtered therethrough or treated thereby, a minimal amount of dissolved silica, which is best in the form of sodium silicate; all as more fully hereinafter set forth and as claimed.

In the purification of water it is now customary to perform softening and sundry other actions upon the water by the use of what are known as exchange silicates; hydrated bodies containing silica and various other components and able to exchange contained bases for the bases in the water. In the type of material most extensively used, the use is for softening water, that is, removing dissolved calcium and magnesium compounds and the material is a hard, granular substance containing silica, alumina, alkali and water in combination. Material of this character on treatment with a hard water gives up its alkali, as for instance, sodium, thereto, and absorbs or takes up the calcium or magnesium of the water in its lieu. Subsequently, the material may be revivified by treatment with sodium chlorid solution to which it now gives up the calcium and magnesium, which go into solution as chlorids, while sodium reënters the material. The material is now ready for reuse. Other types of material may be, and are, made and used containing special bases or components for special purposes; such as manganese-charged zeolites for removing iron and manganese. The alumina in the material may also be replaced by other amphoteric oxids, such as lead, titanium, tin, etc., oxids; but in the type of exchange silicates in most general use, alumina is employed. In use these exchange silicates must necessarily be of a quite particular character, since, on the one hand, they must be hard, rigid and mechanically resistant, in order to avoid mudding down, sliming, etc., when employed in granular beds, through which water may pass with considerable velocity. The material must be strong enough to resist mechanical stresses. On the other hand, the granules must be indefinitely pervious to increase the surface of action as far as may be and they must of course have a high chemical reactivity. Such a combination of characteristics is somewhat hard to achieve but may be accomplished in sundry ways not necessary here to recite. In addition however to making a material which shall have the necessary combination of physical and chemical characteristics, it is of course also necessary that these characteristics be retained by the material in use, since the alternate employment and revivification of the material in a filter-like bed may extend over long periods of time. It is desirable that renewals be not frequent; that the material shall retain its original activity substantially undiminished however long it may be used. I have found however that there are certain classes of water with which there is a deterioration of the exchange silicates of the type described after long periods of use; this deterioration including a tendency toward loss of combined silica from the material. The amount of silica removed from the material by any given water, even in extreme cases, is not great, but there is nevertheless this tendency. The tendency is particularly marked in waters which have previously undergone deflocculating or clarifying treatments with alumina or iron salts, such as sulfate of alumina, sulfate of iron, etc.

Aluminum sulfate is often used for treating waters for the purpose of clarification; that is, for removing mud, bacteria and suspended impurities; and such a treatment may precede a softening treatment with the described silicates. Treatment with aluminum sulfate has no substantial softening action; and is not used for this purpose. Aluminum sulfate reacts with the calcium carbonate (carbonate of lime) which is almost invariably present in waters, and forms alumina in a gelatinous hydrated condition; and this latter envelops and carries down suspended impurities. Iron salts are often used in the same manner, since the ultimate result is the production of hydrated sesquioxids of iron which act in the same manner as the hydrated alumina. For practical purposes, the two sesquioxids are regarded as equivalent. The calcium sulfate formed from the aluminum sulfate for the most part remains in solution and the hardness of the water is not changed. Very frequently lime is used in connection with the aluminum sulfate; in which event the water becomes more or less hard if not originally so. In treating water with aluminum sulfate, it is of course the intention always to use no more than is necessary; it is not the intention to have any dissolved sulfate of alumina remaining after the treatment. Nevertheless, some aluminum sulfate, or dissolved alumina, is apt to remain in solution. And I have found the waters coming from sulfate of alumina clarification, and particularly those containing any residual alumina, are detrimental in their action on the exchange silicates.

I have found that the stated deteriorating action of waters upon the exchange silicates may be prevented or avoided by the expedient of adding to the water prior to its contact with the exchange silicate, a minimal quantity of silica in solution; best in the form of sodium silicate. This addition I have found is particularly useful in the case of waters which have been preliminarily clarified with aluminum sulfate or with iron sulfate. The amount of sodium silicate to be added to the water prior to its passage through the exchange silicate is usually very small. It rarely exceeds one to two grains per gallon. By the addition of this small amount of silica to the water, the water is rendered, so to speak, indifferent toward the contained silica of the exchange silicate and the latter is not impoverished in silica by the passage of the water. The composition of the silicate as regards silica remains constant; in other words, its character does not change. In the event that the water so treated contains the minimal amounts of aluminum sulfate or other soluble alumina compounds hereinbefore referred to, some reaction may take place between the silica so added and the contained alumina, but this results in producing gel materials containing alumina and silica which have the same chemical or exchange properties as the exchange silicates and which in the small amounts which can be formed under the conditions herein contemplated have no deleterious effect upon the physical properties of the exchange silicates, being simply stored up in its pores. So far as they are formed, they may be described as being an advantageous result since they have base-exchanging properties and, to the extent of their formation, add to the activity of the material.

As a typical example of the performance of the present process I may adduce the treatment of a raw water. This raw water, which was somewhat colored, contained about 20 parts per million of $SiO_2$. After clarifying the water by the addition of about 15 to 20 parts per million of ordinary commercial aluminum sulfate $$(Al_2(SO_4)_3 + 18aq.)$$

and filtration, the silica in the clarified water was reduced to about 12 parts per million. The hardness of the water was unchanged and the amount of free $CO_2$ was increased to about 4 to 6 parts per million. This water on filtration through exchange silicates was found to take up silica therefrom to some extent; it tended to replace the dissolved silica removed in the clarification by abstracting silica from the silicates. On softening it by passage through exchange silicates a large part of the free $CO_2$ became saturated with abstraction of base from the silicate, while the amount of $SiO_2$ increased to about the original amount in the clarified raw water. The actual loss of silica from the silicates in the softening treatment was small but to the extent to which it occurred it was detrimental. To the clarified water coming from the alumina clarification, dissolved silica was added in the form of silicate of sodium, the amount used being usually equivalent to about 6 to 8 parts per million of $SiO_2$. The sodium silicate was diluted in a convenient amount of water prior to addition. After mixture with the water about one half the free $CO_2$ was found to be saturated by the soda of the sodium silicate while the amount of $SiO_2$ was increased immediately to the original amount found in the raw water. Prior to the addition of sodium silicate, traces of aluminum probably existing as aluminum sulfate but perhaps as hydrate of aluminum, were found in the water, these traces being in such condition that they could not be filtered off. These traces disappeared after the addition of sodium silicate solution; and the treated water on being passed through the exchange silicate for the purpose of softening was found to be without change in the amount of silica, either in the water or in the exchange silicate itself.

As a rule it may be said that where the amount of silica in raw water has been reduced by an alum (sulfate of aluminum) treatment to an amount less than that usual in natural waters of similar compositions which do not attack exchange silicates, the addition of silica to a corresponding degree appears to be necessary to prevent deterioration of the exchange material. As stated, this deterioration in any event with the usual waters is very small; but it is desirable to prevent even this small degree of action. With very soft waters or waters containing small amounts of dissolved salts, or waters containing high amounts of organic matter or free acids, somewhat higher amounts of silica are necessary than with hard waters or waters containing but little organic matter. Even distilled water loses its aggressiveness against the exchange silicates on addition of a little sodium silicate. In general, only such soft waters which have several of the properties mentioned above as dangerous, require the use of higher amounts of silica in order to prevent the deterioration caused by the dissolved substances when softening them to zero. Absolutely soft waters are sometimes treated with the exchange silicates for other purposes than removing hardness, as for example, removing iron and manganese, and the addition of sodium silicate is then also useful in such treatments other than softening. Occasionally in treating water containing large amounts of organic matter or carbonates, the sodium silicate may produce a precipitate but this precipitate may be easily removed by simple filtration or settling. The sodium silicate may be added to the water in any convenient manner, as by pumping the solution into the water lines or by thoroughly mixing the solution with the water in open tanks. Its addition is most advantageous after the water has been clarified, whether its clarification be by alum or otherwise. This method is of course not to be restricted to the examples mentioned but may be used also in all other cases where water is aggressive against exchange silicates, as it is sometimes, for example, after treatment by the lime-soda or other softening processes.

What I claim is:—

1. In the purification of water by treatment with exchange silicates, the process which comprises adding to water a small amount of silica in soluble form and thereafter passing such water over or through a granular bed of such silicate.

2. In the purification of water by treatment with exchange silicates, the process which comprises adding thereto a small proportion of sodium silicate and thereafter passing such water over or through a granular bed of such silicate.

3. In the purification of water, the process which comprises clarifying such water with a salt of a sesquioxid, thereafter adding a small proportion of silica in soluble form and passing the so-treated water over or through a granular bed of an exchange silicate.

4. In the purification of water, the process which comprises clarifying such water with an alumina salt, thereafter adding a small proportion of silica in soluble form and passing the so-treated water over or through a granular bed of an exchange silicate.

In testimony whereof, I affix my signature.

HEINRICH KRIEGSHEIM.